United States Patent [19]
Pinai et al.

[11] Patent Number: 5,935,230
[45] Date of Patent: Aug. 10, 1999

[54] MULTIPROCESSOR ARRANGEMENT INCLUDING BUS ARBITRATION SCHEME INVOLVING PLURAL CPU CLUSTERS THAT ADDRESS EACH OTHER AS "PHANTOM" CPUS

[75] Inventors: Felix Pinai, Fountain Valley; Manhtien Phan, Lake Forest, both of Calif.

[73] Assignee: Amiga Development, LLC, North Sioux City, S. Dak.

[21] Appl. No.: 08/890,515

[22] Filed: Jul. 9, 1997

Related U.S. Application Data

[60] Provisional application No. 60/036,924, Feb. 7, 1997.

[51] Int. Cl.$^6$ .................................................... G06F 13/14
[52] U.S. Cl. ........................ 710/111; 710/100; 710/101; 710/107; 710/113; 710/114; 712/11; 712/15; 712/16; 712/1; 712/3; 364/716.01; 711/157
[58] Field of Search ...................................... 395/100, 101, 395/107, 293, 800.11, 800.15, 800.16, 800.1, 800.03, 114; 364/230, 716.01; 711/157; 710/111, 100, 101, 107, 113, 114; 712/11, 15, 16, 3, 1

[56] References Cited

U.S. PATENT DOCUMENTS

| | | | |
|---|---|---|---|
| 5,515,516 | 5/1996 | Fisch et al. ............................... | 395/294 |
| 5,561,784 | 10/1996 | Chen et al. .............................. | 711/157 |
| 5,596,727 | 1/1997 | Literati et al. .......................... | 395/281 |

OTHER PUBLICATIONS

*Pentium® Pro Family Developer's Manual*, vol. 1 (Specifications), Chapter 4 (Bus Protocol), Intel® Corporation, P.O. Box 7641, Mt. Prospect, IL, 60056–7641 (order No. 242690), Jan. 1996.

IBM Technical Disclosure Bulletin vol. 32 No. 8b; Movable bus arbiter and shared bus address, Jan. 1990.

B. J. Holman (IBM Tech. Discl. Bulletin; vol. 21 No. 11; Control to enable one of duplicate circuits, Apr. 1979.

*Primary Examiner*—Ayaz R. Sheikh
*Assistant Examiner*—Frantz Blanchard Jean
*Attorney, Agent, or Firm*—Thelen Reid & Priest, LLP; Anthony Claiborne

[57] ABSTRACT

At least two clusters of CPUs are present in a multiprocessor computer system. Each CPU cluster has a given number of CPUs, each CPU having an associated ID such as an ID number. An additional ID number, not associated with a CPU in the same cluster, is associated with the opposite CPU cluster that appears to the original cluster as a "phantom" processor. A round-robin bus arbitration scheme allows ordered ownership of a common bus within a first cluster until the ID reaches the "phantom" processor, at which time bus ownership passes to a CPU in the second cluster. This arrangement is preferably symmetric, so that when a CPU from the first cluster requests ownership of the bus, it is granted bus ownership by virtue of the first cluster's appearance to the second cluster as a "phantom" CPU.

19 Claims, 7 Drawing Sheets

BUS OWNERSHIP ID COUNTER STATE DIAGRAM

MULTIPROCESSOR ARRANGEMENT INCLUDING BUS ARBITRATION SCHEME INVOLVING PLURAL CPU CLUSTERS THAT ADDRESS EACH OTHER AS "PHANTOM" CPUS

CROSS-REFERENCE TO RELATED APPLICATION

This application claims priority to U.S. provisional application 60/036,924, filed Feb. 7, 1997.

BACKGROUND OF THE INVENTION

1. Field of the Invention

The present invention relates to multiprocessor arrangements in computer systems. More specifically, the invention relates to an extension of a known multiprocessor scheme to allow additional processors to share the same bus.

2. Related Art

In recent years, two-CPU (dual) and four-CPU (quad) processing x86 servers have become a staple of the corporate world. Powered first by Intel®i486 chips, then Pentium® processors, and finally Pentium® Pro chips, these systems have expanded the role of the PC server into fields once dominated by significantly more expensive minicomputers and mainframes. The emergence of Intel's® MP spec boosted the proliferation of these servers by providing a unified specification for hardware and software vendors.

It is recognized that multiprocessing is not the only option for handling an increased workload. Network supervisors could merely reduce the size of networks and increase the number of servers. This approach, however, would be far more costly. Additionally, company-wide exchange of data would be slowed as the various networks would have to constantly communicate with each other over relatively slow network lines.

A case could also be made for merely selecting a more powerful processor in the first place. Throughout the history of PC servers, there have often been RISC (reduced instruction set computer) processors available that have been more powerful than the current x86 leader. Multiprocessor x86 configurations, however, have usually been able to match or exceed the power of these single RISC chips at significantly less cost. These multiprocessor configurations have also maintained compatibility with a wider range of readily available hardware and software, further reducing the costs of operation and implementation.

A further argument for multiprocessor-ready servers is the efficient scalability afforded to the network. Companies can start with exactly the amount of processor power they need. They can utilize the fastest x86 processor available, or opt for a more affordable alternative. As the network grows, increased use can be accommodated simply by adding more processors and memory. This approach is substantially more cost-effective than replacing the entire server. It also spreads out a company's IS (information systems) investment over a longer period, reducing financing costs and better accommodating current budgets.

Accordingly, the advantages of multiprocessor arrangements are apparent, and the need in the art for optimal multiprocessor schemes has become of increasing importance.

In the mid-to-late 1980s, the versatile x86-based personal computer was the subject of a major evolution in both form and function. Diverging from their roots as terminal emulators and single user workstations, many of these systems were reconfigured for use in network server configurations. At a department level, these original servers and their accompanying local area networks proved to be an effective, low cost alternative to traditional mini-computer/terminal environments.

But as networks grew in both size and importance, it became obvious that further expansion of storage and memory would need to be matched by a significant increase in processor power. To address this issue, a number of different multiprocessor configurations were developed. Some of these configurations emphasized power, often at the sacrifice of cost efficiency. There has been a need in the art to combine power and cost-efficiency.

Over the history of x86 server development, several configurations have evolved for implementing multiple processors. For example, concerning Pentium® Pro based servers, three multiprocessing architectures are being used. They are the Parallel Bus, cc Numa, and Clustering architectures. While each of these configurations has its own advantages, each also involves certain difficulties.

The parallel bus architecture has been, by far, the most popular in the development of x86-based servers. In a parallel bus architecture, the various processors are said to be "closely coupled." Communication and interaction among the various processors is rapid and efficient, with all parts of the process operating at fill external CPU speed. For example, one of Assignees's earliest multiprocessing 386 servers was based on a proprietary C-Bus architecture in which all processors and memory resided on an extended 32-bit bus. This implementation worked well for earlier processors with their relatively limited power requirements and low heat generation. The parallel bus architecture design offers easy and efficient scalability, and with Intel's® Orion chip set, this architecture supports a sustained data bandwidth exceeding 400 MB/s. Quad processor support is built into the Pentium® Pro chip, making four-CPU systems based on this architecture cost-efficient. And because of Intel's® MP spec v 1.1 and 1.4, operating systems and applications supporting such servers are both plentiful and economical.

Using more than four Pentium® Pro chips, however, the advantages of the conventional parallel bus architecture begin to fade. For signal strength, the processors must be in close physical proximity. But physically grouping the processors together is a design challenge in itself, and heat build-up becomes a critical problem.

The Pentium® Pro chip also offers its own logical challenges. To promote multiprocessing the Pentium® Pro chips offers built-in support for only a two-bit processor APIC (Advanced Programmable Interrupt Controller) ID code. This results in four possible binary combinations—00, 01, 10 and 11. Translated into decimal numbers, it supports processor IDs of 0, 1, 2, and 3. It is this processor identification that facilitates data bus arbitration in an SMP (symmetrical multiprocessing) system. While this design makes engineering two- and four-CPU systems easier and more cost-effective, it does not support a standard parallel upgrade path for more than four processors, thereby substantially limiting system performance.

Like the parallel bus architecture, the cc Numa architecture keeps processors closely coupled, resulting in efficient use of processor resources. The downside of this design, however, is that it requires a proprietary operating system and proprietary applications. This makes it an inappropriate design for most standard corporate environments. As a result, systems utilizing this architecture are primarily utilized for unique high-end applications requiring more than eight processors.

In a clustering environment, multiple servers are actually connected together to achieve extended multiprocessing. This use of duplicate servers makes this approach inherently fail-over ready. Up to now, this has also been the only easy way to harness the power of more than four Pentium® Pro chips. This approach, however, is plagued with limitations.

The most prominent limitation of the clustering approach is the physical link between the servers. With current Ethernet technology, the server to server connection is limited to a 100 MB/s bandwidth. This is less than a fifth of the potential bandwidth of a parallel bus architecture. Partitioning data storage between the two servers is also a problem that needs to be addressed in server-clustering arrangements.

Another major problem with server-clustering is a lack of SMP software support. To date, there is no industry-wide standard to support true symmetrical multiprocessing in a clustering configuration. As a result, clustering is currently application-dependent. Most clustered servers today are redundant servers, utilized for their fail-over capabilities rather than enhanced processor power. These configurations can, however, co-exist with parallel bus architecture systems.

In view of these various inadequate alternatives to multiprocessing expansion, there has long been a need in the art to develop a server supporting more than four processors such as the Pentium® Pro. To fulfill this need, several issues had to be addressed.

First the logical limitations of the Pentium® Pro chip must be dealt with. As stated above, the basic implementation of the Pentium® Pro chip only supports a two-bit processor ID code. This particular convention limits the number of Pentium® Pro chips in a system to four. To overcome this limitation, the art has not yet tapped unused aspects of the chip to extend the identification process.

Second, bandwidth limitations have been a factor limiting progress in the art. Clustering would be the easiest way to implement multiple processors. But with clustering comes limited bandwidth. There has been a need in the art to tap the benefits of clustering without incurring the bandwidth limitations of a system-to-system link.

Third, physical challenges have hampered progress in this technology. Ideally, a Pentium® Pro chip-based system with more than four processors would offer the bandwidth of a closely-coupled parallel architecture. But physical necessities of coupling more than four chips in a standard parallel architecture results in an intolerable level of heat build-up, as well as an unwieldy system board design. The unmet challenge has been to achieve the bandwidth of a closely-coupled parallel architecture without its physical limitations.

Fourth, electrical requirements, namely extensive power requirements of multiple Pentium® Pro chips, have not been dealt with in the art. A successful multiprocessor server needs to support a large number of Pentium® Pro chips without exceeding the electrical resources of a normal corporate environment. It would need to support these chips in a cost-effective manner.

Fifth, lack of software support has been a problem. A successful corporate server must support off-the-shelf versions of popular operating systems and applications. To comply with this requirement, those skilled in the art must develop a system that conforms to current MP specifications.

It is to meet the foregoing requirements, and to overcome the foregoing limitations, that the present invention is directed, as described in the Summary of the Invention and in the Detailed Description of the Preferred Embodiments thereof. As background for understanding the invention and its advance in the art, a known multiprocessor arrangement is now discussed in more detail.

As introduced above, multiprocessor arrangements, involving plural processors that share a common bus 100, are known in the art, as shown in FIG. 1. This sharing of busses commonly involves controlled sharing of data, address and control busses to allow the CPUs to have access to and control of peripheral devices (not shown).

APIC (Advanced Programmable Interrupt Controller) ID Expansion is a known scheme of identifying each of four processors that share a common bus. The scheme is described in the *Pentium® Pro Family Developer's Manual*, Volume 1 (Specifications), Chapter 4 (Bus Protocol), available from Intel® Corporation, P.O. Box 7641, Mt. Prospect, Ill., 60056-7641 (order no. 242690), January 1996. Reference is also made to U.S. Pat. No. 5,515,516 (Fisch et al, Intel® Corporation), which discloses an initialization mechanism for symmetric arbitration agents. These documents are incorporated herein by reference as if reproduced in full below.

In this known four-processor system, the APIC ID for each processor is assigned by taking the bus number assigned to each processor. FIG. 1 illustrates how the bus number is determined.

Referring to FIG. 1, each processor 0, 1, 2, and 3 has three inputs, BR1#, BR2# and BR3#, as well as one output BR0#. All the BRn# lines of each CPU are interconnected among four processors through four external signals, BREQ0#, BREQ1#, BREQ2# and BREQ3#. This connection associates the APIC ID with each CPU such that the processor can use it during multiprocessor applications.

Upon power-up, the system logic asserts the signal BREQ0# active, leaving the other three signals BREQ1#, BREQ2#, and BREQ3# inactive. This forces the three BR1#–BR3# inputs of each CPU to be as shown in the following chart:

| CPU | BR1# | BR2# | BR3# | | Binary Value |
| --- | --- | --- | --- | --- | --- |
| CPU #0: | 0 | 0 | 0 | = | Binary 0 |
| CPU #1: | 0 | 0 | 1 | = | Binary 1 |
| CPU #2: | 0 | 1 | 0 | = | Binary 2 |
| CPU #3: | 0 | 1 | 1 | = | Binary 3 |

Each CPU uses the binary setting of the BRn# lines to determine its APIC ID.

The Pentium® Pro processor also has a way to strap its APIC ID to belong to a different group of four processors called a cluster. Specifically, address lines A12# and A11# are used for this purpose. Upon reset each CPU, beside determining its lower 2-bit APIC ID, samples the logic state of both A12# and A11# lines to set the cluster ID according to the following chart.

| A12# | A11# | Cluster ID | APIC ID Range |
| --- | --- | --- | --- |
| Logic 0 | Logic 0 | 3 | C–F |
| Logic 0 | Logic 1 | 2 | 8–B |
| Logic 1 | Logic 0 | 1 | 4–7 |
| Logic 1 | Logic 1 | 0 | 0–3 |

Since A12# and A11# are normally pulled to logic 1, the default cluster ID for a standard four-CPU system is 0.

As mentioned above, this known arrangement provides multiprocessor ability for up to only four processors. Accordingly, in view of the foregoing performance demands and design challenges, there has been a need in the art to provide common-bus multiprocessor arrangements in which a larger number of processors are supported. The present invention is directed to meeting these performance demands and design challenges.

SUMMARY OF THE INVENTION

The invention makes use of an innovative bus-clustering technology to expand the quantity of processors that may efficiently and cost-effectively share a common bus. The invention has addressed the design problems discussed in the Background of the Invention by improving upon the best elements of parallel bus and server-clustering architectures. The result is a bus-clustering architecture allowing an increase in the processing power of the multiprocessor system without incurring the shortfalls of known multiprocessor systems.

The invention involves at least two clusters of CPUs. Each CPU cluster has a given number of CPUs, each CPU having an associated ID such as an ID number. An additional ID number, not associated with a CPU in the same cluster, is associated with the entire opposite CPU cluster that appears to the original duster as a "phantom" processor. A round-robin bus arbitration scheme allows ordered ownership of a common bus within a first cluster until the ID reaches the "phantom" processor, at which time bus ownership passes to a CPU in the second cluster. This arrangement is preferably symmetric, so that when a CPU from the first cluster again requests ownership of the bus, it is granted bus ownership by virtue of the first cluster's appearance to the second cluster as a "phantom" CPU.

Other objects, features and advantages will become apparent to those skilled in the art upon a reading of the following Detailed Description in accompaniment with the attached drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
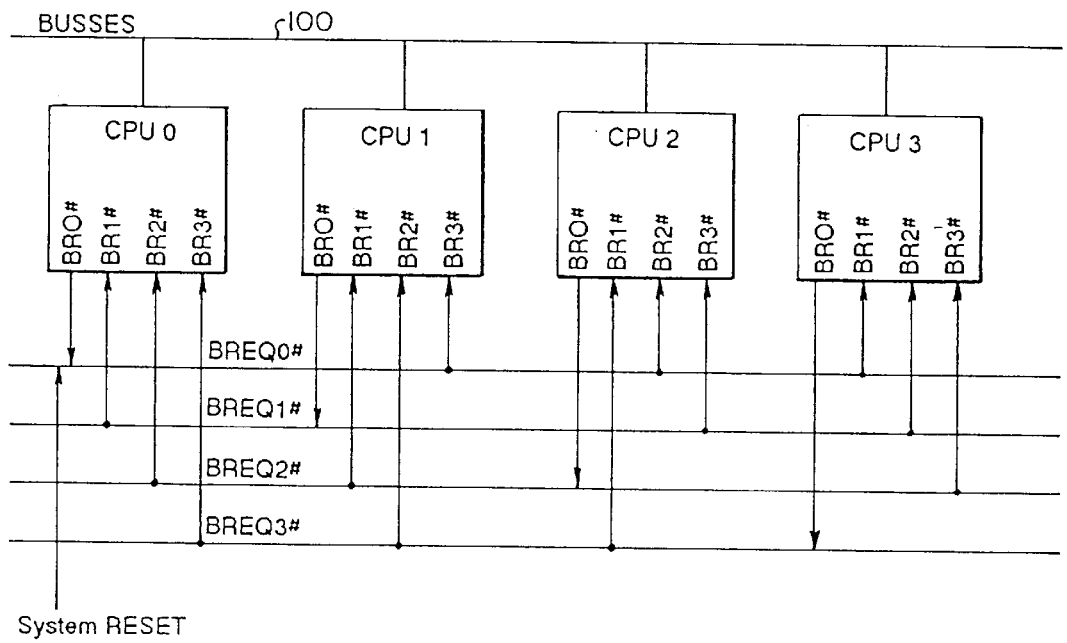
FIG. 1 illustrates a conventional multiprocessor arrangement involving four CPUs that share a bus, each CPU being assigned a respective two-bit APIC ID code.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose. Moreover, elements, connections, and functions that are well known to those skilled in the art are not described herein, as they are not needed to enable those skilled in the art to make and use the invention. For example, conventional operation and connection of busses to multiple processors, not being central to the invention that is claimed, need not be presented and are omitted for the sake of clarity.

This specification focuses on a particular embodiment involving expansion of the four-Pentium® Pro system discussed above, into a six-Pentium® Pro system in accordance with bus ID expansion scheme and an inventive bus arbitration expansion scheme. The preferred embodiment has two Tri-6 CPU cards. Each of these cards has an independent three- processor-ready SMP bus, complete with supporting logic that may be of a type known to those skilled in the art. These two "clusters" of processors are then plugged into a 64-bit Parity SMP bus. This design keeps the processors closely coupled, just like a parallel bus architecture, without the related heat and design problems. A separate four-way interleaved memory card is attached to the bus, supporting a sustained data bandwidth of 533 MB/s. This bandwidth is more than enough to support two full PCI busses as well as an EISA bus bridge.

To overcome the logical limitations of the Pentium® Pro chip, the inventive six-CPU system uses a unique expanded bus arbitration configuration. The best way to understand how this system work is to compare it to a typical 4-way SMP architecture. In a 4-CPU system, bus arbitration is implemented in a "round robin" fashion. That is, each processor has equal rights to the bus, and access is handled in an orderly fashion. For example, if all processors needed access to the bus, CPU 0 would gain access first, followed by CPU 1, CPU 2, CPU 3, and then back to CPU 0. If CPU 2 was executing a cycle, and both CPU 3 and CPU 1 requested use of the bus, control would first pass to CPU 3, before cycling back to CPU 1.

For purposes of this 4-way arbitration, processors are identified using a two-bit ID code. The inventive 6-CPU embodiment of the invention modifies this convention. Within each Tri-6 CPU card, individual processors are identified using the two-bit ID code. This yields four possible combinations, although only ID codes 0 through 2 are needed. A programmable logic array (PLA) designed chip on each Tri6 card preferably handles the arbitration, extending the "round robin" scheme found in a 4-CPU system. In this case, however, the fourth processor has been replaced by a "phantom" processor that represents the opposite Tri6 card.

If all 6 processors need access to the bus, CPU 0 on cluster 0 (the first Tri6 card) would gain access first, followed by CPU 1 on cluster 0 and CPU 2 on cluster 0. At this point, access would pass to cluster 1 (the second Tri6 card) represented by the "phantom" CPU. CPU 0 on cluster 1 would then gain access to the bus, followed by CPU 1 on cluster 1 and CPU 2 on cluster 1. Access would then pass back to cluster 0, and the whole process would start again.

This dynamic multiple-CPU arbitration is managed by an extended bus arbiter utilizing a dedicated cluster-ID mapper. This design results in fair and balanced access to the data bus for all six processors while utilizing the standard logical conventions of a 4-CPU design. Processors can communicate with the efficiency, symmetrical access, and scalability of a standard parallel bus while easily overcoming the many limitations of this approach.

This bus-cluster configuration with the inventive dynamic multiple CPU arbitration scheme also yields the important advantage of MP v1.1 and 1.4 spec compatibility. As a result, the inventive 6-CPU solution offers immediate compatibility with all major network operating systems and applications.

Tests indicate that the inventive 6-CPU system with a full complement of Pentium® Pro chips outperforms a similarly equipped 4-CPU system by up to 40%. The difference in cost between these two systems, however, is generally less than 20%. On a timed basis in a demanding environment, that translates into a significantly lower cost per transaction.

Even in a basic one- or two-processor configuration, the inventive six-CPU system will often prove to be the better long term investment. At this level, the 6-CPU system commands a premium of approximately 10%. But thanks to the efficient scalability of the inventive six-CPU system, network supervisors may be able to extend the usefulness of the server several months or even years beyond a four-CPU system. The added performance capacity of the inventive 6-CPU system may even reduce the need to purchase additional departmental servers.

A software standard for clustered systems is in development. Currently referred to as Microsoft Windows Wolfpack, it would provide a means of harnessing the total processor power of clustered Windows NT servers. Even once it is available, clustered systems will still have disadvantages compared to the inventive six-CPU solution. Performance in the clustered-server systems will still be limited by the Ethernet connection between the two servers. At 100 MB/s, even the fastest Ethernet connection offers less than a fifth of the bandwidth of the inventive six-CPU's 64-bit SMP bus. Further, two clustered 4-CPU systems would be significantly more expensive yet yield little or no performance gain.

A small number of server developers have announced plans for an 8-CPU Pentium® Pro chip-based servers. It is estimated that an 8-CPU system will be able to deliver up to 25% more performance than the inventive six-CPU solution. Because of the significant physical, thermal, and electrical design considerations of an eight-CPU system not designed in accordance with the principles of the present invention, however, these servers are expected to cost approximately 80% more than a six-CPU solution designed in accordance with the invention. Their extremely low return on investment makes these eight-CPU solutions an unsound financial choice.

Moreover, the electrical power demanded by an eight-CPU solution would probably exceed the power available in most standard corporate installations. The inventive six-CPU system stays comfortably within this limit.

Many of the advantages of the present invention having been presented, the invention is now described in greater detail, focusing on the six-Pentium® Pro system introduced above.

This specification focuses on a particular embodiment involving expansion of a four-Pentium® Pro system into a six-Pentium® Pro system. To expand the design of a four-Pentium® Pro system into a six-Pentium® Pro system, two major modifications are required. First, it is necessary to expand the APIC (Advanced Programmable Interrupt Controller) ID from four to six. Second, it is necessary to expand bus arbitration from four to six.

Expansion of the APIC ID is discussed first.

Figure 2:
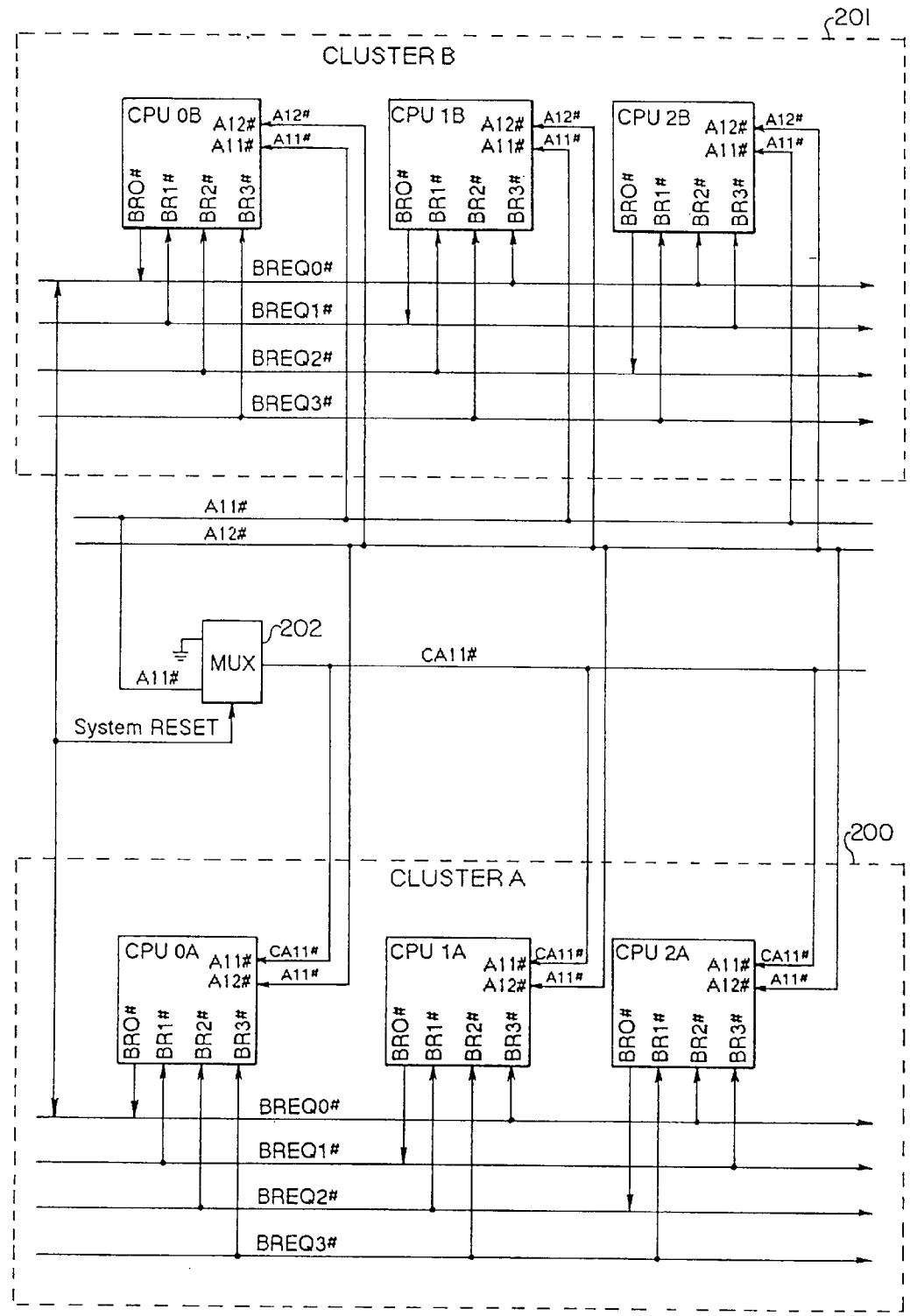
FIG. 2 illustrates APIC ID expansion according to a preferred embodiment of the present invention, the scheme involving two clusters of three CPUs per cluster.

According to the invention, to add two more Pentium® Pro CPUs into a four-CPU system, the CPUs are partitioned into different clusters. FIG. 2 shows one approach for the partitioning.

Referring to FIG. 2, upon reset, multiplexer 202 outputs a zero logic level to signal line CA11#. The three CPUs in Cluster A sample their A11# input, finding CA11# to be at logic 0. They also sample A12#, finding it to be at logic 1. This implies they belong to the Cluster 1. After the system reset pulse, the multiplexer returns to its state of passing A11# unchanged to signal line CA11#.

Also upon reset, the other three CPUs in FIG. 2, which are in Cluster B, read their A11# and A12#. Both A11# and A12# are at logic 1, thus identifying the cluster as Cluster 0.

The overall APIC ID assignments for all the 6 CPUs in the following chart.

| Pentium ® Pro CPU | APIC ID | |
|---|---|---|
| Group A CPU 0 | 4 | (0100) |
| Group A CPU 1 | 5 | (0101) |
| Group A CPU 2 | 6 | (0110) |
| Group B CPU 0 | 0 | (0000) |
| Group B CPU 1 | 1 | (0001) |
| Group B CPU 2 | 2 | (0010) |

The lower 2 bits of each APIC ID also indicate the BUS ID for each processor within the cluster to which it belongs.

Now, the bus arbitration expansion performed according to a preferred embodiment of the invention is described. But first, reference is again made to FIG. 1.

The second purpose of the signals BR0#–BR3# on each CPU shown on FIG. 1 is for bus arbitration. Each CPU uses signal BR0# as an output to request access to the system bus while it monitors the requests of the other three CPUs on the system through the three input signals BR1#, BR2#, and BR3#. The interconnection among the four CPUs allows all four CPUs to be tightly coupled, in order to resolve bus arbitration and thus determine which CPU can access the system bus at any given time. A round-robin priority scheme facilitates the equal access for each CPU in the system.

This arbitration technique dictates that each CPU, when owning the system bus, is required to monitor whether any bus request coming from the others CPUs is asserted. If no pending request is observed, then the bus owner can 'park' on the bus until a new request is detected. When a new request is finally received, bus ownership is relinquished to the next processor in line based on a priority chain.

Figure 3:
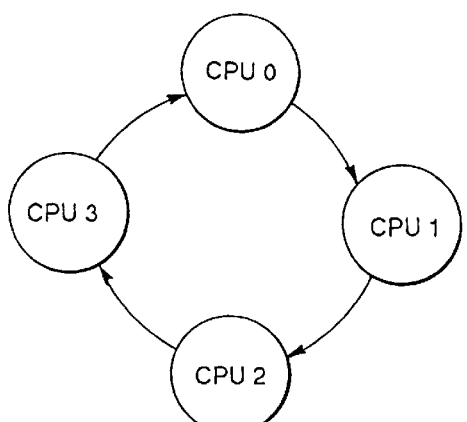
FIG. 3 illustrates the bus ownership priority chain of the known arrangement shown in FIG. 1.

Priority chain CPU0-CPU1-CPU2-CPU3-CPU0 . . . , illustrated in FIG. 3, ensures orderly sharing of bus access. As a particular example, if CPU1 owns the bus and then both CPU0 and CPU2 simultaneously assert a request, the new bus ownership is given to CPU2 and not to CPU0 because CPU2 is next in line after CPU1. After CPU2 finishes its cycle, and if, in the meantime CPU3 asserts its own request while CPU0 still maintains its original request, CPU0 is not granted the ownership but CPU3 is the new owner instead. This 'Next-In-Line' rule forces the grant to be passed to CPU3 since it comes after CPU2 even though the request from CPU0 was asserted well ahead of CPU3's request.

To expand from a known four-CPU system into the six-CPU embodiment according to the present invention, bus arbitration is expanded from 4-way arbitration into 6-way arbitration. Preferably, the 'Next-In-Line' rule is maintain to guarantee equal access among the CPUs. According to this preferred embodiment, the six-CPU system is partitioned into two clusters, each cluster including three CPUs. The inventive arbitration scheme focuses on how to arbitrate among the processors in cluster A, plus arbitrating among the processors in cluster B, plus arbitrating between the two clusters.

Figure 5:
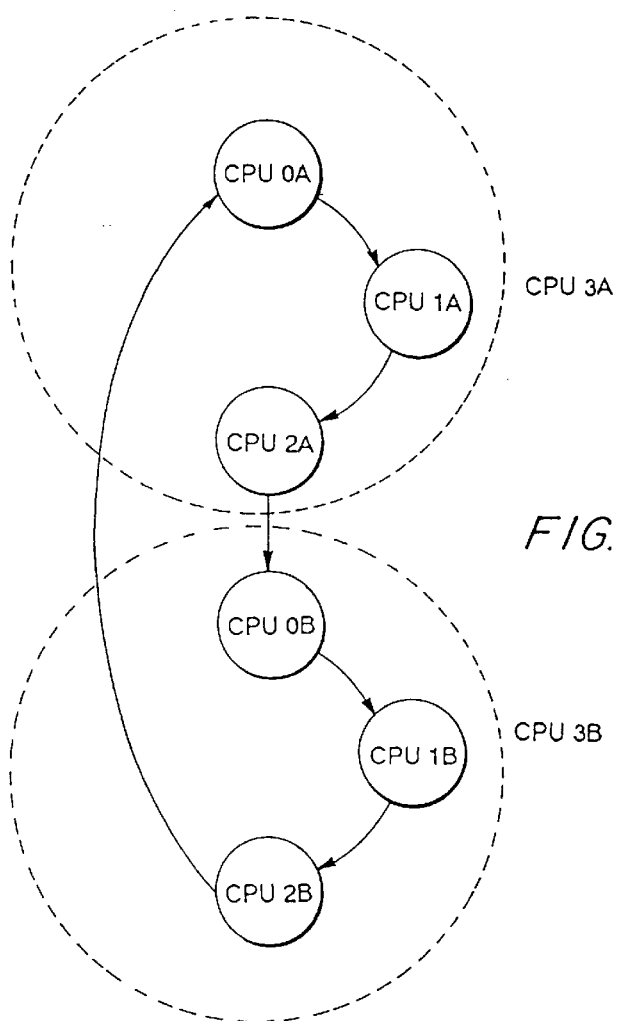
FIG. 5 illustrates the bus ownership priority chain of the inventive arrangement shown in FIGS. 2 and 4.

According to the present invention, the four-element 'Next-In-Line' chain described with reference to FIG. 3 is transformed into the six-element 'Next-In-Line' chain pictured in FIG. 5. In this new chain there is a link between two smaller chains of three processors each, namely: CPU0A-CPU1A-CPU2A and CPU0B-CPU1B-CPU2B. This grouping allows the virtualization of each group of three processors as the fourth processor belonging to the opposite group. That is, the inventive 6-way arbitration can be seen as an extension of the 4-way arbitration scheme, with the important difference that when the bus ownership of a cluster is virtually given to processor CPU3_ on the chain (either CPU3A or CPU3B), this ownership is actually given entirely to the opposite cluster (Cluster B or Cluster A). Return of ownership to the first cluster occurs when the second cluster has virtually given the control to its CPU3_ (CPU3B or CPU3A).

Figure 4:
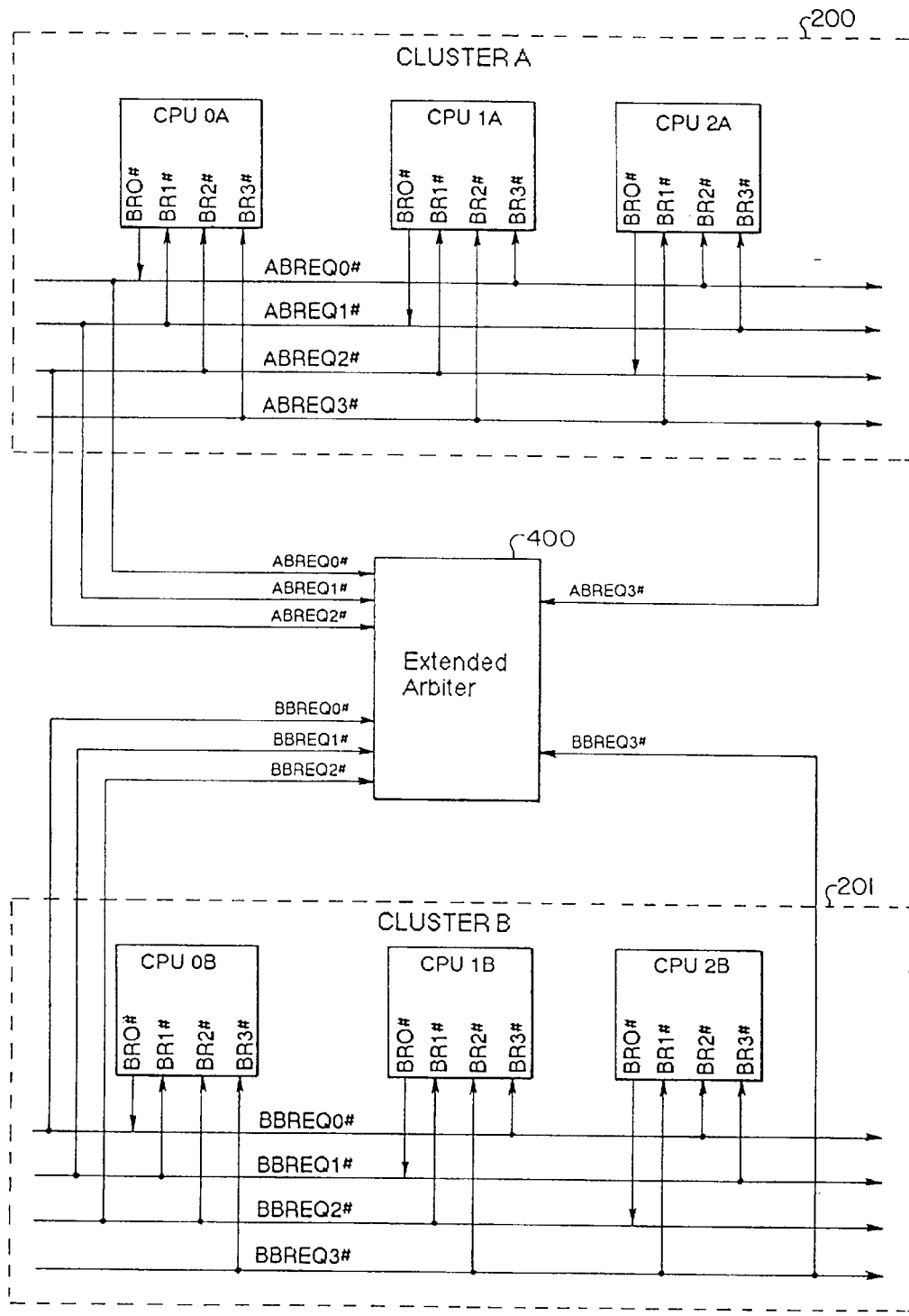
FIG. 4 illustrates bus arbitration expansion according to a preferred embodiment of the present invention.

The extended arbiter 400 in FIG. 4 (detailed structurally in FIG. 6 and detailed functionally in FIGS. 7, 8 and 9) implements the inventive arbitration approach. The extended arbiter 400 monitors all the bus request lines (AREQ0#–AREQ2#) from the processors in Cluster A, and generates the appropriate BREQ3# signal that serves as the bus request of a 'virtualized' CPU3B for Cluster B. Symmetrically, the signal AREQ3# is the request to Cluster A when any bus request line BREQ0#–BREQ2# from Cluster B is asserted.

Figure 6:
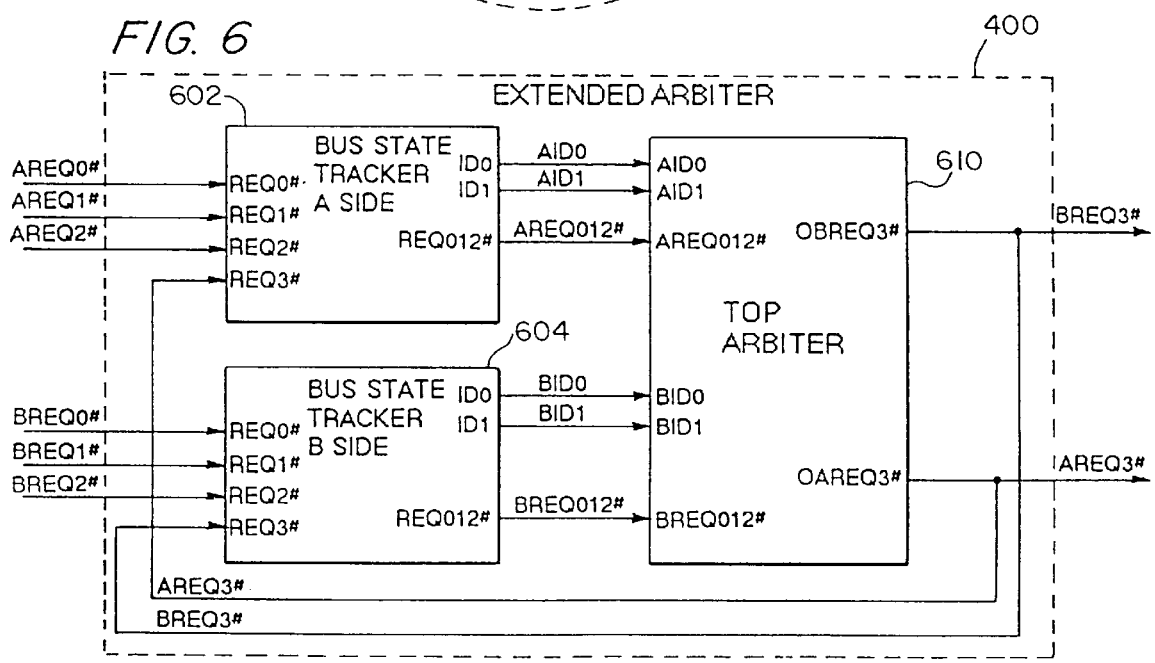
FIG. 6 illustrates details of a preferred embodiment of the extended arbiter shown in block diagram form in FIG. 4.

FIG. 6 schematically illustrates the structure of the extended arbiter. It includes bus state tracker 602 for Cluster A, Bus State Tracker 604 for Cluster B, and a top arbiter 610. These elements may be implemented using any suitable programmable logic array (PLA), such as an ALTERA 7064 LC 44, as recognized by those skilled in the art. Although operating on different input signals, bus state trackers 602 and 604 are identical in function, tracking current bus ownership on the cluster and outputting the current owner's ID.

Figure 7:
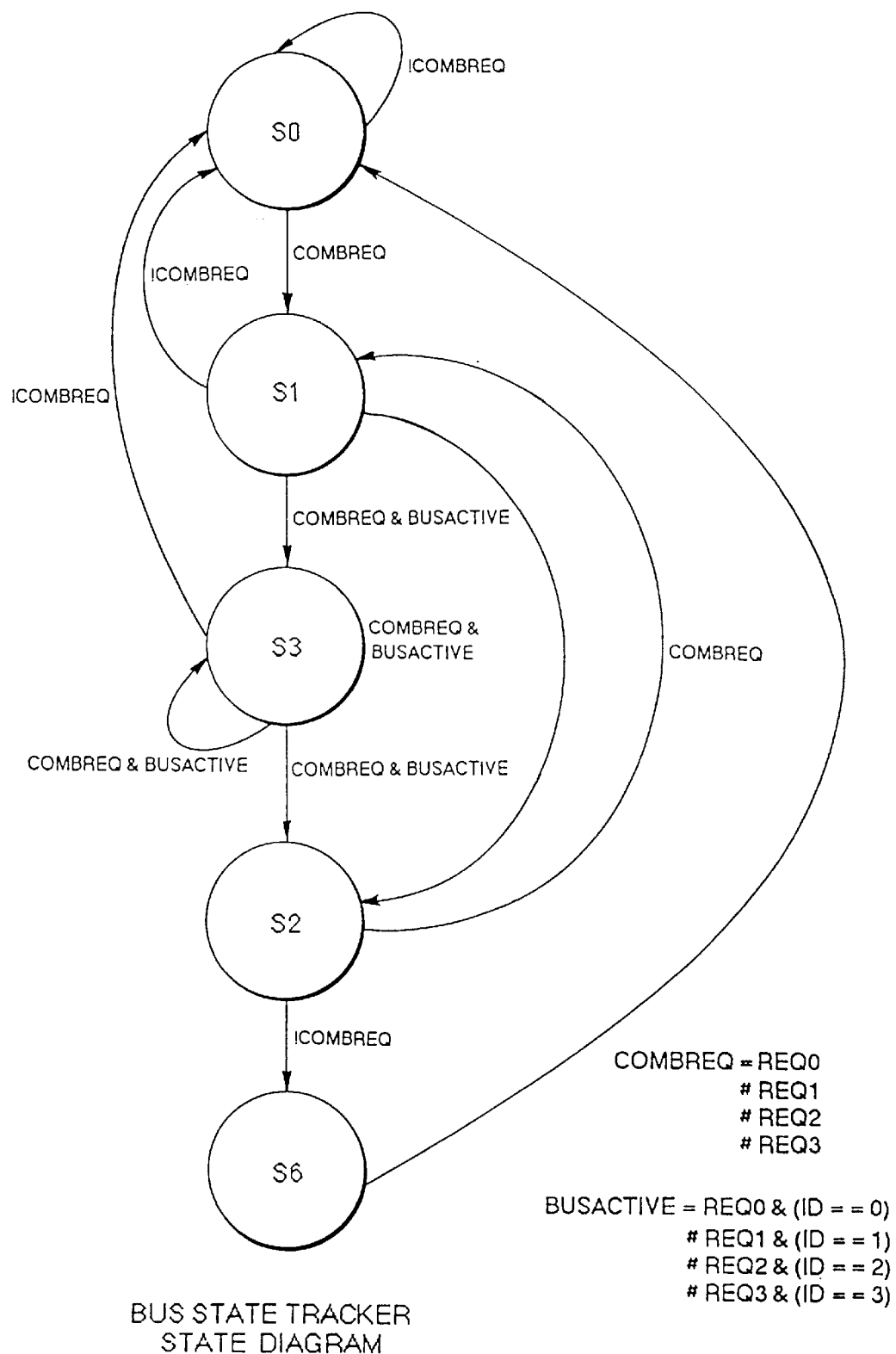
FIG. 7 is a state diagram of each of the bus state trackers shown in FIG. 6.

FIG. 7 shows the bus state tracker state machine, whose primary function is to monitor the different states of the bus. Such states include Bus Idle, Bus Ownership Changeover, and Bus Parking. When ownership is changed, a signal called UPDATED is asserted to allow the BUS ID Counter logic to reflect the ID of the new owner.

Figure 8:
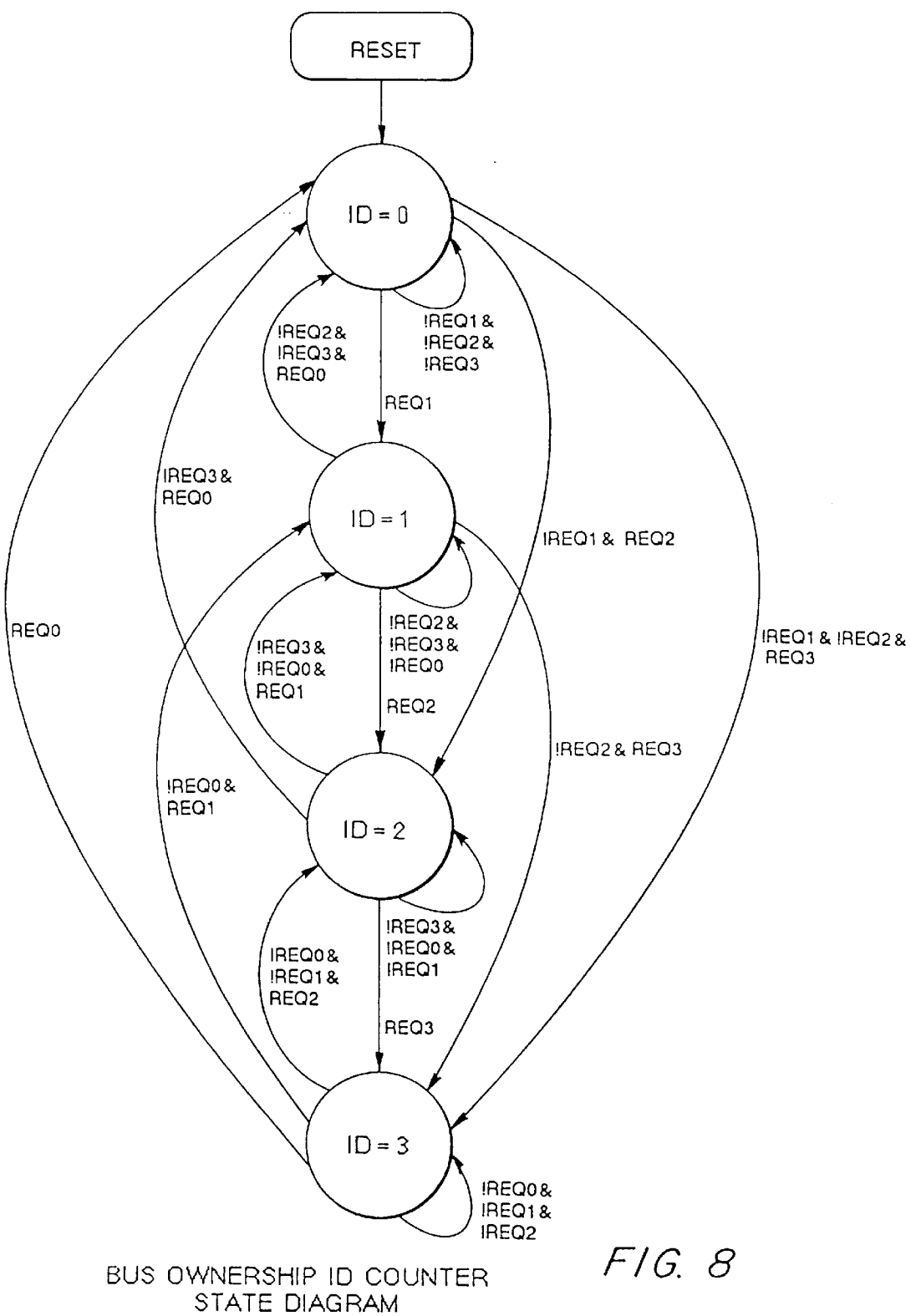
FIG. 8 is a state diagram of the bus ownership ID counter showing control performed by the bus state trackers in FIG. 6.

Also concerning the bus state tracker, the state diagram in FIG. 8 shows a sequence to modify a two-bit ID counter (based on current owner) onto a new owner. This implements the four-element 'Next-In-Line' arbitration described with reference to FIG. 3.

Referring again to FIG. 6, the 2-bit IDs from the two bus state trackers are fed into the Top Arbiter, along with the signals_REQ012# (that is, AREQ012# or BREQ012#) that are the result of the logical OR of all three bus requests on each cluster. The Top Arbiter synthesizes the two signals AREQ3# and BREQ3# and sends them back to their respective clusters.

Figure 9:
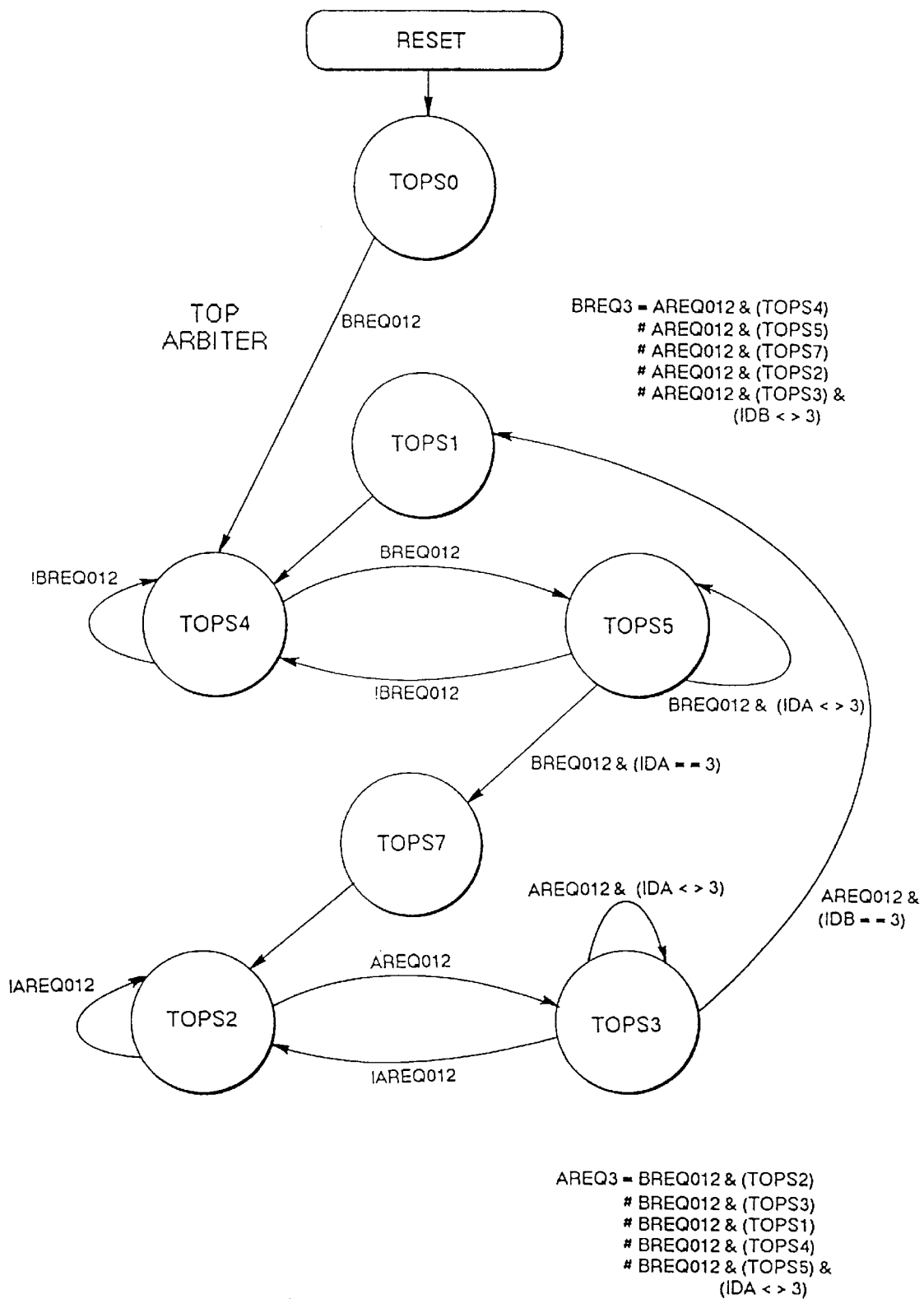
FIG. 9 is a state diagram of the top arbiter shown in FIG. 6.

The top arbiter has a state machine that keeps track of which cluster has control over the system bus. FIG. 9 shows the state diagram of the bus monitoring performed by the top arbiter. When AREQ012# or BREQ012# is asserted, the state machine activates the corresponding_REQ3# line (AREQ3# or BREQ3#) and waits until one cluster gives access to its CPU3 (indicated by the two ID bits being set to 11). The top arbiter then switches bus ownership from that cluster to the opposite cluster. States TOPS5 and TOPS3 are where the switchover occurs.

The operation of the Bus State Tracker State Machine is now described in more detail, with special reference to FIGS. 6, 7, and 8.

As introduced above, the purposes of this state machine are to track which CPU owns the bus, and to provide an appropriate signal UPDATED to the BUS OWNERSHIP ID COUNTER logic to update the Bus Owner ID when a changeover occurs. Two signals, COMBREQ and BUSACTIVE, are generated and sampled throughout this state machine. COMBREQ and BUSACTIVE are defined logically as follows:

$$\text{COMBREQ} = \text{REQ0 OR REQ1 OR REQ2 OR REQ3}$$

$$\begin{aligned}
\text{BUSACTIVE} = \quad & [\text{REQ0 AND (ID=0)}] \\
\text{OR} \quad & [\text{REQ1 AND (ID=1)}] \\
\text{OR} \quad & [\text{REQ2 AND (ID=2)}] \\
\text{OR} \quad & [\text{REQ3 AND (ID=3)}]
\end{aligned}$$

COMBREQ is the logical OR of all four bus request lines going into this logic. When one of the bus request line is active, COMBREQ will be set active.

BUSACTIVE is active when the bus request of the actual bus owner is active. BUSACTIVE is sampled to determine whether the actual owner is still asserting its request line.

Ownership tracking is performed using five states, as shown in FIG. 7.

State S0 is the initial state upon system reset. The default value for the bus owner ID is defined as 3 upon system reset. In state S0, the state machine is in an idle condition. The system can be idle, either coming out from a reset state or when no CPU is requesting the system bus. The bus owner ID in state S0 can be 3 if the system was being reset or remains the same since the last time the bus is accessed. State S0 will then wait until the signal COMBREQ is asserted, indicating that at least one CPU is requesting access to the system bus. The state machine then transitions to state S1. The new bus owner ID is updated since there is a bus ownership changeover.

In state S1, the system bus has already been granted to the new owner. Three scenarios can occur next.

S1a) The new owner completes its accesses and no other request is pending. In this event, it deasserts its own requests line. This forces the signal COMBREQ inactive. S1 will then transition back to S0. No bus ownership will change because there is no request from the other CPUs.

S1b) The new owner still asserts its own request through the sampling of the combined signal COMBREQ & BUSACTIVE. In this event, the actual owner is trying to perform 'Bus Parking' in which it hangs to the bus and asserts all its bus accesses as long as it does not detect any request from the other CPUs on the bus. State S1 then transitions to state S3 for further processing. No ownership has changed there.

S1c) The ownership has been given to the new owner, but it declines to perform an access (bus access abortion) while another CPU needs the bus. This can be sampled through the logical AND of COMBREQ and (NOT BUSACTIVE), indicating that there is at least one requesting CPU while the request of the actual owner is not active (negation of BUSACTIVE). In this situation, the state will transition to state S2.

State S3 is somewhat similar to state S1. Three scenarios are possible.

S3a) If there is no bus request active, then control of the state machine falls back to state S0. No new ownership is granted in this case.

S3b) If the owner still wants to 'park' on the bus, it has to assert its own request line and monitor the logic state of the other CPUs' request lines. Both COMBREQ and BUSACTIVE are true, forcing the state machine to stay in state S3.

S3c) If another CPU wants the bus, it will activate its own request signal. The owner CPU detects the request and is forced to give up the system bus. It acknowledges relinquishment of the bus by deasserting its own request line, thus deactivating BUSACTIVE and forcing the state machine to go to state S2. The owner ID is updated at that time.

State S2 is entered either from a Bus Access Abortion in state S1, or from a bus ownership change in state S3. Only COMBREQ is sampled to determine whether a bus request is pending If COMBREQ is true, the state machine will transition back to state S1 and repeat the bus monitoring process. If COMBREQ is false, no CPU wants the bus, and the bus becomes idle. Control of the state machine transitions to state S6 which in turn transitions back to the original state S0.

Referring to FIG. 8, the bus ownership ID counter state diagram is described.

This state diagram changes from one state to another when the UPDATED signal, derived from the bus state tracker machine, is asserted. Each state represents the ID of the CPU that owns the system bus. The update process is very simple. For a given state (owner ID), transfer to a new owner is based on the following formula.

The new owner ID is obtained by taking the active bus request of the CPU that has the ID number closest to the ID of the actual owner based on the sequence:

0-1-2-3-0-1-2-3-0-1 -2-3-0-1-2-3- . . .

For example, if CPU2 owns the bus and both CPU0 and CPU1 want the bus, then the new ownership will be granted to CPU0 and not CPU1 because CPU0 is the next in line after CPU2 in the above sequence. CPU3 is really the next in line but since it does have any request, it is bypassed.

Next, a more detailed description of the top arbiter is provided, with reference to FIG. 9.

The primary function of the top arbiter is to determine which cluster has control over the system bus. It uses two bus state tracker machines (FIG. 6 elements 602, 604), one for each cluster, to determine which CPU controls the bus within each cluster. The top arbiter then arbitrates between the two clusters A and B.

The bus state tracker 602 on side A produces two ID bits, AID0 and AID1 (collectively, "IDA"), to designate the ID number of the CPU owner on Cluster A. Bus state tracker 602 also generates signal AREQ012 as the logical OR of all the requests from the three CPUs on the Cluster A. Whenever a CPU on the A side wants the system bus, AREQ012 is asserted.

Identically, bus state tracker 604 on the B side has the similar signals: BID0, BID1 (collectively, "IDB"), and BREQ012.

Referring again to FIG. 9, the BREQ3 and AREQ3 signals are defined as follows:

BREQ3 = [AREQ012 AND (TOPS4)]
OR [AREQ012 AND (TOPS5)]
OR [AREQ012 AND (TOPS7)]
OR [AREQ012 AND (TOPS2)]
OR [AREQ012 AND (TOPS3) AND (IDB ≠ 3)]

AREQ3 = [BREQ012 AND (TOPS2)]
OR [BREQ012 AND (TOPS3)]
OR [BREQ012 AND (TOPS1)]
OR [BREQ012 AND (TOPS4)]
OR [BREQ012 AND (TOPS5) AND (IDA ≠ 3)]

FIG. 9 shows a state machine for the tope arbiter that arbitrates between the two clusters of CPUs. As shown in FIG. 9, the top arbiter performs the following steps:

a) Upon reset, the top arbiter assumes arbitrarily that the Cluster A has control over the system bus, so that the top arbiter is set to state TOPS0. Subsequently, the top arbiter transitions to state TOPS4.

b) The top arbiter then continuously monitors the condition of BREQ012, whose active state indicates that at least one CPU in Cluster B is requesting the bus. A "virtual" request signal AREQ3 is generated to indicate to all CPUs in Cluster A that its 'phantom' CPU3 is requesting the bus, and the state transitions to TOPS5. The top arbiter then waits until ownership is granted to this 'phantom' CPU3.

c) When both AID0 and AID1 are true, 'phantom' CPU3 gains ownership of the system bus and the state transitions to TOPS7. This transition to state TOPS7 signifies a change in bus ownership. In state TOPS7, the top arbiter effectively transfers control of the bus to Cluster B, and prevents further access of the Cluster A CPUs. The state then automatically transitions to TOPS2.

d) At state TOPS2, Cluster B has ownership: all Cluster B CPUs are sequentially allowed to access the bus. In the meantime, the top arbiter monitors the logic state of the signal AREQ012 which is the logical OR of all the bus requests from the Cluster A. If AREQ012 is not activated, then no CPU in Cluster A wants the bus yet and the state remains at TOPS2. When asserted, AREQ012 causes the signal BREQ3 to be generated for Cluster B and the state transitions to TOPS3. The same process as in Cluster A is repeated: ownership of Cluster B's CPU3 is awaited which is noted when both BID0 and BID1 are true, at which time the state transitions to TOPS1 and bus ownership is transferred back to cluster A.

Modifications and variations of the above-described embodiments of the present invention are possible appreciated by those skilled in the art in light of the above teachings. For example, this specification has focused on a particular embodiment involving expansion of a four-Pentium® Pro system into a six-Pentium® Pro system. However, other processors, and other amounts of expansion, lie within the contemplation of the present invention. It is therefore to be understood that, within the scope of the appended claims and their equivalents, the invention may be practiced otherwise than as specifically described.

What is claimed is:

1. A multiprocessor computer system having a bus, the system comprising:

a) a first cluster of a plural number m CPUs called Cluster A, having a first CPU ID scheme with at least (m+1) IDs including 0A, 1A, . . . mA, wherein:

a1) a first CPU is associated with an ID 0A,
a2) a second CPU is associated with an ID 1A, and so forth, through
a3) an m-th CPU is associated with an ID (m−1)A, and
a4) an ID mA is not associated with any CPU in Cluster A;

b) a second cluster of a plural number n CPUs called Cluster B, having a second CPU ID scheme with at least (n+1) IDs including 0B, 1B, . . . nB, wherein:
b1) a first CPU is associated with an ID 0B,
b2) a second CPU is associated with an ID 1B, and so forth, through
b3) an n-th CPU is associated with an ID (n−1)B, and
b4) an ID nB is not associated with any CPU in Cluster B; and c) an arbiter for arbitrating control of the bus among the CPUs from Cluster A and Cluster B, the arbiter including:
c1) means for associating entire Cluster B as a phantom CPU with the ID mA in Cluster A; and
c2) means for associating entire Cluster A as a phantom CPU with the ID nB in Cluster B.

2. The computer system of claim 1, wherein:
m=n=3;
Cluster B is associated with Cluster A's ID 3A as a phantom processor; and
Cluster A is associated with Cluster B's ID 3B as a phantom processor.

3. The computer system of claim 2, wherein:
the CPUs are all Intel® Pentium® Pro processors.

4. An arrangement for use in a multiprocessor computer system for arbitrating CPU access to a common bus, the arrangement comprising:
at least first and second CPU clusters including respective pluralities of CPUs; and
associating means for uniquely associating CPUs with respective CPU IDs and for associating a special CPU ID from a given one of the first and second CPU clusters with an entire opposite one of the first and second CPU clusters, so as to arbitrate access to the common bus by CPUs from both the first and second CPU clusters by allowing only a single CPU at a time to control the common bus.

5. The arrangement of claim 4, wherein:
each of the first and second clusters includes first, second and third CPUs having respective first, second and third CPU IDs; and
the associating means constitutes means for associating a fourth CPU ID with the entire opposite one of the first and second CPU clusters.

6. The arrangement of claim 4, wherein the associating means includes:
arbiter means for monitoring for a bus request from a bus-requesting CPU in a bus-requesting CPU cluster, and for generating a first or second bus request signal that indicates the bus request to one of the first and second CPU clusters that is opposite to the bus-requesting CPU cluster.

7. The arrangement of claim 6, wherein the arbiter means includes:
first and second bus state tracker means for receiving bus requests from the first and second CPU clusters, respectively, for indicating receipt of the bus requests, and for identifying the bus-requesting CPU within the bus-requesting CPU cluster.

8. The arrangement of claim 7, wherein the arbiter means includes:
top arbiter means, responsive to the first and second bus state tracker means, for generating the first and second bus request signals.

9. The arrangement of claim 8, wherein:
the first and second bus state tracker means and the top arbiter means constitute programmable logic arrays embodying state space machines.

10. A method of arbitrating control of a bus that is shared among plural processors included in at least a first processor cluster and a second processor cluster, the method comprising:
a) granting bus control to a first sequence of at least two actual processors that are within the first processor cluster; and
b) granting bus control to a first virtual processor that is identified in the first processor cluster, this granting bus control to the first virtual processor constituting:
b') granting bus control to a second sequence of at least two actual processors that are within the second processor cluster.

11. The method of claim 10, further comprising:
c) granting bus control to a second virtual processor that is identified in the second processor cluster, this granting bus control to the second virtual processor constituting:
c') granting bus control to a third sequence of at least two actual processors that are within the first processor cluster.

12. The method of claim 11, wherein the first sequence of actual processors constitutes a predetermined, prioritized sequence in which order bus control is strictly granted, so as to implement a "next-in-line" ordering scheme within each of the first and second processor clusters.

13. The method of claim 10, wherein the first sequence of actual processors constitutes a predetermined, prioritized sequence in which order bus control is strictly granted, so as to implement a "next-in-line" ordering scheme within each of the first and second processor clusters.

14. An arrangement for use in a multiprocessor computer system for arbitrating CPU access to a common bus, the arrangement comprising:
a) at least first and second CPU clusters including respective numbers of CPUs; and
b) associating means for uniquely associating CPUs with respective CPU IDs and for associating a special CPU ID from a given one of the first and second CPU clusters with an opposite one of the first and second CPU clusters, so as to arbitrate access to the common bus by CPUs from both the first and second CPU clusters by allowing only a single CPU at a time to control the common bus wherein the associating means includes:
b') arbiter means for monitoring for a bus request from a bus-requesting CPU in a bus-requesting CPU cluster, and for generating a first or second bus request signal that indicates the bus request to one of the first and second CPU clusters that is opposite to the bus-requesting CPU cluster; wherein the arbiter means includes:
b") first and second bus state tracker means for receiving bus requests from the first and second CPU clusters, respectively, for indicating receipt of the bus requests, and for identifying the bus-requesting CPU within the bus-requesting CPU cluster.

15. The arrangement of claim 14, wherein:

each of the first and second clusters includes first, second and third CPUs having respective first, second and third CPU IDs; and the associating means constitutes means for associating a fourth CPU ID with the opposite one of the first and second CPU clusters.

16. The arrangement of claim 14, wherein the arbiter means includes:

top arbiter means, responsive to the first and second bus state tracker means, for generating the first and second bus request signals.

17. The arrangement of claim 16, wherein:

the first and second bus state tracker means and the top arbiter means constitute programmable logic arrays embodying state space machines.

18. A method of arbitrating control of a bus that is shared among plural processors included in at least a first processor cluster and a second processor cluster, the method comprising:

a) granting bus control to a first sequence of at least one actual processor within the first processor cluster; and b) granting bus control to a first virtual processor that is identified in the first processor cluster, this granting bus control to the first virtual processor constituting:

b') granting bus control to a second sequence of at least one actual processor that is within the second processor cluster;

wherein the first sequence of actual processors constitutes a predetermined, prioritized sequence in which order bus control is strictly granted, so as to implement a "next-in-line" ordering scheme within each of the first and second processor clusters.

19. The method of claim 18, further comprising:

c) granting bus control to a second virtual processor that is identified in the second processor cluster, this granting bus control to the second virtual processor constituting:

c') granting bus control to a third sequence of at least one actual processor that is within the first processor cluster.

* * * * *